(12) United States Patent
Kawai et al.

(10) Patent No.: US 9,712,072 B2
(45) Date of Patent: Jul. 18, 2017

(54) INVERTER DEVICE (71) Applicant: SHINDENGEN ELECTRIC MANUFACTURING CO., LTD., Tokyo (JP)

(72) Inventors: Hiroyuki Kawai, Hanno (JP); Ken-ichi Iwao, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/038,507

(22) PCT Filed: Nov. 29, 2013

(86) PCT No.: PCT/JP2013/082228
§ 371 (c)(1),
(2) Date: May 23, 2016

(87) PCT Pub. No.: WO2015/079569
PCT Pub. Date: Jun. 4, 2015

(65) Prior Publication Data
US 2016/0308454 A1    Oct. 20, 2016

(51) Int. Cl.
*H02M 7/53*    (2006.01)
*H02M 5/458*    (2006.01)
(Continued)

(52) U.S. Cl.
CPC .............. *H02M 5/458* (2013.01); *H02M 1/08* (2013.01); *H02M 5/45* (2013.01); *H02M 5/4505* (2013.01);
(Continued)

(58) Field of Classification Search
CPC .... H02M 7/538; H02M 7/487; H02M 7/4826; H02M 2007/4811; H02M 5/548; H02M 2001/0006; H02M 7/5387
(Continued)

(56) References Cited

U.S. PATENT DOCUMENTS

| 5,068,777 A * | 11/1991 | Ito .......................... H02P 27/08 318/811 |
| 5,684,687 A * | 11/1997 | Ichihara ............... H03K 17/063 363/97 |
| 8,736,220 B2 * | 5/2014 | Ogawa .................. H02M 5/458 318/400.01 |

FOREIGN PATENT DOCUMENTS

| GB | 2 337 643 | 11/1999 |
| JP | 2000-333467 | 11/2000 |

(Continued)

OTHER PUBLICATIONS

International Search Report for PCT/JP2013/082228 mailed Feb. 10, 2014, 3 pages.
(Continued)

*Primary Examiner* — Rajnikant Patel
(74) *Attorney, Agent, or Firm* — Nixon & Vanderhye P.C.

(57) ABSTRACT

A power converter converts input power into DC power. A first switching element is connected between an output node and a high voltage node of the power converter. A second switching element is connected between the output node and a low voltage node of the power converter. First to third driver circuits have first to third power supply nodes to be supplied with first to third operating voltages based on first to third voltages at the output node, the low voltage node, and the high voltage node, respectively. The first to third driver circuits drive the first to third switching elements based on the first to third voltages, respectively. A rectifier circuit is connected between the power supply nodes of the
(Continued)

first and second driver circuits, and supplies a current from the power supply node of the first driver circuit toward the power supply node of the third driver circuit.

4 Claims, 7 Drawing Sheets

(51) Int. Cl.
*H02M 5/45* (2006.01)
*H02M 1/08* (2006.01)
*H02M 7/12* (2006.01)
*H02M 1/00* (2006.01)

(52) U.S. Cl.
CPC ...... *H02M 7/12* (2013.01); *H02M 2001/0006* (2013.01)

(58) Field of Classification Search
USPC ............. 363/16–20, 21.04, 21.06, 21.14
See application file for complete search history.

(56) References Cited

FOREIGN PATENT DOCUMENTS

| | | |
|---|---|---|
| JP | 2007-209108 | 8/2007 |
| JP | 2009-219269 A | 9/2009 |
| JP | 2010-5737 A | 1/2010 |
| JP | 2012-010532 | 1/2012 |
| JP | 2013-13325 A | 1/2013 |
| WO | WO 99/27639 | 6/1999 |
| WO | WO 2011/117932 A1 | 9/2011 |

OTHER PUBLICATIONS

Written Opinion of the ISA for PCT/JP2013/082228 mailed Feb. 10, 2014, 4 pages.
Reply to Written Opinion for PCT/JP2013/082228 dated Aug. 19, 2014, 3 pages.
International Preliminary Report on Patentability for PCT/JP2013/082228 dated Nov. 20, 2014, 4 pages.
Notice of Allowance mailed May 9, 2017 in Japanese Application No. 2015-550296, with English translation (6 pages).

* cited by examiner

INVERTER DEVICE

This application is the U.S. national phase of International Application No. PCT/JP2013/082228 filed 29 Nov. 2013 which designated the U.S., the entire content of which is hereby incorporated by reference.

TECHNICAL FIELD

The present invention relates to an inverter device.

BACKGROUND ART

Conventionally, there are inverter devices that generate an AC output by controlling a high side circuit and a low side circuit to alternately perform switching (see, for example, Patent Document 1). In the above inverter device, a so-called isolated power supply is used as a power source that supplies respective operating voltages of the high side circuit and the low side circuit.

CITATION LIST

Patent Document

[Patent Document 1] Japanese Patent Laid-Open Publication No. 2000-333467

DISCLOSURE OF THE INVENTION

Problems to be Solved by the Invention

Some of the above-described inverter devices provided with the high side circuit and the low side circuit includes an inverter device provided with a rectifier that rectifies an output of a three-phase AC power generator to generate a desired DC input. Thyristors configuring the rectifier are typically provided on the high voltage side of the output of the three-phase AC power generator, and are driven by a driver circuit operable by an operating voltage based on a voltage of a so-called high side arm connected to an output node, on the high voltage side, of the rectifier. For this reason, it requires an isolated power supply for supplying an operating voltage of the driver circuit that drives the thyristors provided in the rectifier.

Therefore, one aspect of the present invention has an object to provide an inverter device that does not require an isolated power source for supplying the operating voltage of the driver circuit based on the voltage of the high side arm.

Means for Solving the Problems

One aspect of the present invention proposes an inverter device including: a power converter configured to power-convert an input power into a DC power to generate a voltage of the DC power between a high voltage node and a low voltage node; a first switching element connected between an output node and the high voltage node; a second switching element connected between the output node and the low voltage node; a first driver circuit having a power supply node to be supplied with an operating voltage based on a voltage at the output node, and the first driver circuit being configured to drive the first switching element based on the voltage at the output node; a second driver circuit having a power supply node to be supplied with an operating voltage based on a voltage at the low voltage node, and the second driver circuit being configured to drive the second switching element based on the voltage at the low voltage node; a third driver circuit having a power supply node to be supplied with an operating voltage based on a voltage at the high voltage node, and the third driver circuit being configured to drive the power converter based on the voltage at the high voltage node; and a rectifier circuit connected between the power supply node of the first driver circuit and the power supply node of the third driver circuit, and the rectifier circuit being configured to supply a current from the power supply node of the first driver circuit toward the power supply node of the third driver circuit.

According to one aspect of the present invention, when the second switching element turns off, and the first switching element is turned on, the output node is electrically connected to the high voltage node through the first switching node. Thus, the operating voltage of the first driver circuit based on the voltage at the output node increases. When the operating voltage of the first driver circuit increases, this operating voltage of the first driver circuit is supplied through the rectifier circuit to the power supply node of the third driver circuit. Consequently, the voltage at the power supply node of the third driver circuit based on the voltage at the high voltage node (arm voltage) increases. For this reason, it is possible to secure the operating voltage of the third driver circuit based on the voltage at the high voltage node, without separately providing a power supply for the third driver circuit. Accordingly, it becomes possible to provide an inverter device requiring no isolated power supply for supplying the circuit operating voltage based on the arm voltage.

The above-described inverter device may further includes, for example, a rectifier circuit connected between the power supply node of the second driver circuit and the power supply node of the third driver circuit, and the rectifier circuit being configured to supply a current from the power supply node of the second driver circuit toward the power supply node of the third driver circuit.

The above-described inverter device may further includes, for example, a bootstrap circuit configured to charge the power supply node of the first driver circuit by a voltage at the power supply node of the second driver circuit when the voltage at the output node decreases, and boost a voltage at the power supply node of the first driver circuit in response to an increase in the voltage at the output node.

In the above-described inverter device, for example, the bootstrap circuit may include: a diode having an anode connected to the power supply node of the second driver circuit and a cathode connected to the power supply node of the first driver circuit; and a capacitor connected between the power supply node and the output node of the second driver circuit.

The above-described inverter device may further includes, for example, at least a power supply configured to generate an operating voltage of the second driver circuit, and supply the operating voltage to the power supply node of the second driver circuit.

In the above-described inverter device, for example, the rectifier circuit may be a diode.

In the above-described inverter device, for example, the power converter may include any one of: a rectifier circuit configured to rectify the input power; a step-down chopper circuit configured to step down a voltage of the input power; and a protection circuit configured to block the input power.

Effects of the Invention

According to one aspect of the present invention, it is possible to omit an isolated power source for supplying the operating voltage of the driver circuit based on the voltage of the high side arm.

MODE FOR CARRYING OUT THE INVENTION

Hereinafter, embodiments of the present invention will be described with reference to the drawings.

Here, constituent elements in the present embodiment are appropriately replaceable with the existing constituent elements or the like. Additionally, various variations including combinations with other existing constituent elements are available. Therefore, the description of the present embodiment is not intended to limit the claimed inventions.

First Embodiment (Description of Configuration)

Figure 1:
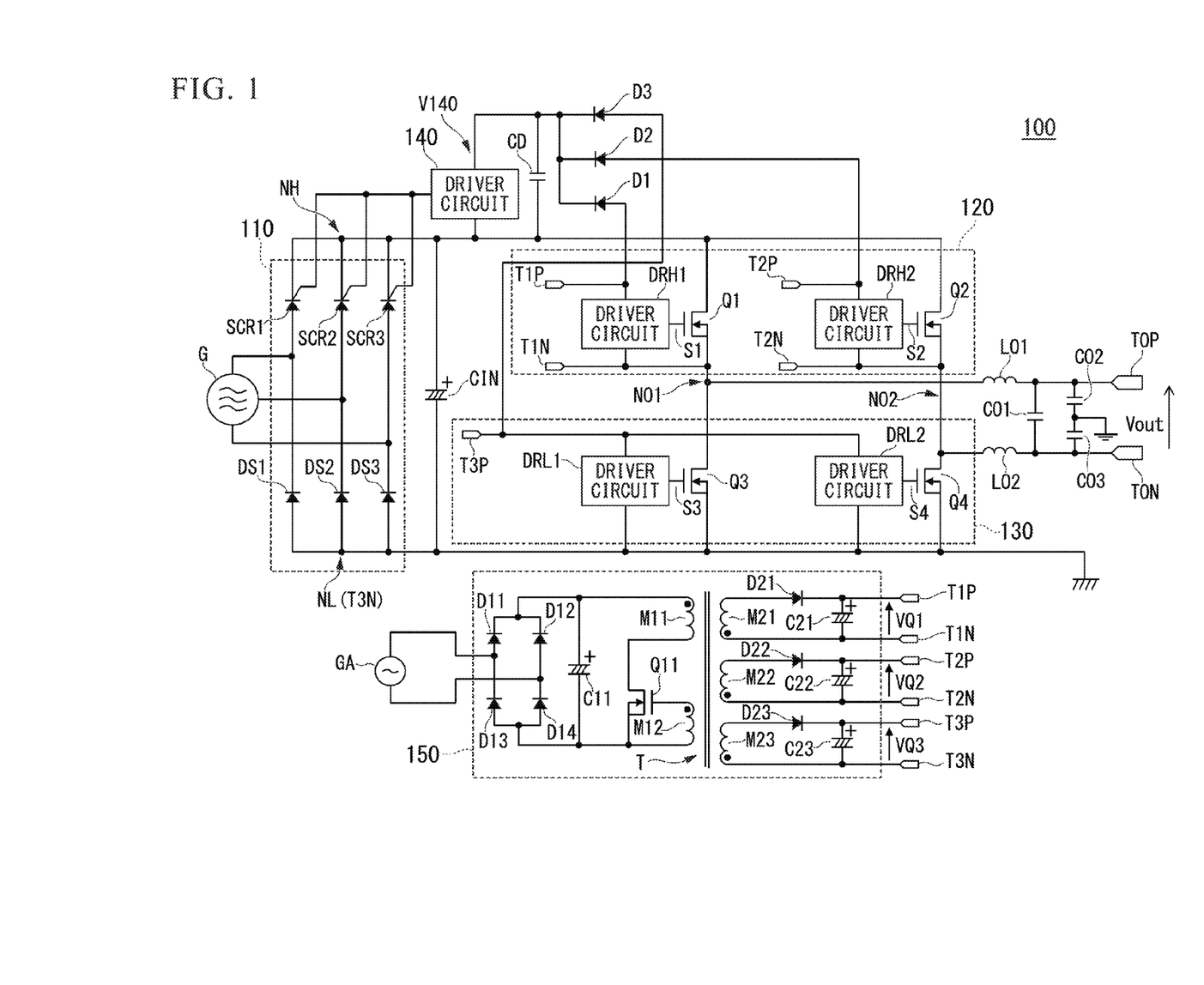
FIG. 1 is a diagram showing an example of a circuit configuration of an inverter device according to a first embodiment of the present invention.

FIG. 1 shows an example of a circuit configuration of an inverter device 100 according to a first embodiment of the present invention.

Schematically, the inverter device 100 according to the first embodiment includes a rectifier circuit between a power supply node of a driver circuit DRH1 and a power supply node of a driver circuit 140. The driver circuit DRH1 drives a high side switching element Q1 based on a voltage at the output node NO1. The driver circuit 140 drives thyristors SCR1, SCR2, and SCR3 of a rectifier 110 based on a voltage at a high voltage node NH forming a high side arm. The rectifier circuit includes a diode D1. Additionally, the inverter device 100 includes a rectifier circuit between a power supply node of a driver circuit DRH2 and the power supply node of the driver circuit 140. The driver circuit DRH2 drives a high side switching element Q2 based on a voltage at an output node NO2. The rectifier circuit includes a diode D2. Further, the inverter device 100 includes a rectifier circuit between a power supply node of each of the low side driver circuits DRL1 and DRL2 and the power supply node of the driver circuit 140. The rectifier circuit includes a diode D3. Additionally, an operating voltage of the driver circuit 140 based on a voltage at the high voltage node NH is secured through the diodes D1, D2, and D3.

Describing more specifically, the inverter device 100 includes a rectifier 110, a high side circuit 120, a low side circuit 130, a driver circuit 140, a power supply 150, a capacitor CIN, diodes D1, D2, and D3, a capacitor CD, inductors LO1 and LO2, capacitors CO1, CO2, and CO3, output terminals TOP and TON, positive power supply terminals T1P, T2P, and T3P, and negative power supply terminals T1N, T2N, and T3N. Here, although a three-phase AC power generator G and an AC power supply GA are not constituent elements of the inverter device 100 in the present embodiment, both of these elements, or either one element, may be a constituent element of the inverter device 100.

The rectifier 110 includes thyristors SCR1, SCR2, and SCR3, and diodes DS1, DS2, and DS3. Here, an anode of the thyristor SCR1 is connected to a cathode of the diode DS1, and a connecting point of these elements is supplied with an AC output of, for example, a U-phase of the three-phase AC power generator G. Additionally, an anode of the thyristor SCR2 is connected to a cathode of the diode DS2, and a connecting point of these elements is supplied with an AC output of, for example, a V-phase of the three-phase AC power generator G. Furthermore, an anode of the thyristor SCR3 is connected to a cathode of the diode DS3, and a connecting point of these elements is supplied with an AC output of, for example, a W-phase of the three-phase AC power generator G. Respective cathodes of the thyristors SCR1, SCR2, and SCR3 are connected commonly to the high voltage node NH forming the high side arm. Additionally, respective anodes of the diodes DS1, DS2, and DS3 are connected commonly to a low voltage node NL forming a low side arm. The rectifier 110 functions as a power converter that receives, as an input power, a three-phase AC power output from the three-phase AC power generator G, and converts the input power into a DC power, thus generating a DC power voltage between the high voltage node NH and the low voltage node NL.

The high side circuit 120 includes switching elements Q1 and Q2 including, for example, FETs (Field Effect Transistor), and driver circuits DRH1 and DRH2 for driving the switching elements Q1 and Q2. Among these, the switching element Q1 is connected between the high voltage node NH and the output node NO1. In other words, a drain of the switching element Q1 is connected to the high voltage node NH, a source thereof is connected to the output node NO1, and a gate thereof is connected with an output of the driver circuit DRH1. The driver circuit DRH1 includes a ground node connected to the output node NO1, and a power supply node to be supplied with an operating voltage based on a voltage at the output node NO1. The driver circuit DRH1 drives the gate of the switching element Q1 based on the voltage at the output node NO1. The power supply node and the ground node of the driver circuit DRH1 are connected respectively with a later-described positive power supply terminal T1P and a later-described negative power supply terminal T1N of the power supply 150.

The switching element Q2, which configures the high side circuit 120 along with the switching element Q1, is connected between the high voltage node NH and the output node NO2. In other words, a drain of the switching element Q2 is connected to the high voltage node NH, a source thereof is connected to the output node NO2, and a gate thereof is connected with an output of the driver circuit DRH2. The driver circuit DRH2 includes a ground node connected to the output node NO2, and a power supply node to be supplied with an operating voltage based on a voltage at the output node NO2. The driver circuit DRH2 drives the gate of the switching element Q2 based on the voltage at the output node NO2. The power supply node and the ground node of the driver circuit DRH2 are connected respectively with a later-described positive power supply terminal T2P and a later-described negative power supply terminal T2N of the power supply 150.

The low side circuit 130 includes switching elements Q3 and Q4 including, for example, FETs (Field Effect Transistor), and driver circuits DRL1 and DRL2 for driving the switching elements Q3 and Q4. Among these, the switching element Q3 is connected between the output node NO1 and the low voltage node NL. In other words, a drain of the switching element Q3 is connected to the output node NO1, a source thereof is connected to the low voltage node NL, and a gate thereof is connected with an output of the driver circuit DRL1. The driver circuit DRL1 includes a ground node connected to the low voltage node NL, and a power supply node to be supplied with an operating voltage based on a voltage at the low voltage node NL. The driver circuit DRL1 drives the gate of the switching element Q3 based on the voltage at the low voltage node NL. The power supply node and the ground node of the driver circuit DRL1 are connected respectively with a later-described positive power supply terminal T3P and a later-described negative power supply terminal T3N of the power supply 150.

The switching element Q4, which configures the low side circuit 130 along with the switching element Q3, is connected between the output node NO2 and the low voltage node NL. In other words, a drain of the switching element Q4 is connected to the output node NO2, a source thereof is connected to the low voltage node NL, and a gate thereof is connected with an output of the driver circuit DRL2. The driver circuit DRL2 includes a ground node connected to the low voltage node NL, and a power supply node to be supplied with an operating voltage based on a voltage at the low voltage node NL. The driver circuit DRL2 drives the gate of the switching element Q4 based on the voltage at the low voltage node NL. The power supply node and the ground node of the driver circuit DRL2 are connected respectively with the later-described positive power supply terminal T3P and the later-described negative power supply terminal T3N of the power supply 150.

The respective gates of the thyristors SCR1, SCR2, and SCR3 configuring the rectifier 110 are connected with an output of the driver circuit 140. The driver circuit 140 includes a ground node connected to the high voltage node NH, and a power supply node to be supplied with an operating voltage based on a voltage at the high voltage node NH. The driver circuit 140 drives the rectifier 110 based on the voltage at the high voltage node NH. In other words, the driver circuit 140 individually drives the gates of the thyristors SCR1, SCR2, and SCR3 configuring the rectifier 140, in synchronization with respective phases of the AC outputs of the respective phases output from the three-phase AC power generator G, thus generating a desired DC power between the high voltage node NH and the low voltage node NL.

The diode D1 is connected between the power supply node of the driver circuit DRH1 configuring the high side circuit 120 and the power supply node of the driver circuit 140. In other words, an anode of the diode D1 is connected to the power supply node of the driver circuit DRH1, and a cathode thereof is connected to the power supply node of the driver circuit 140. The diode D1 functions as a rectifier circuit for supplying a current from the power supply node of the driver circuit DRH1 toward the power supply node of the driver circuit 140.

Additionally, the diode D2 is connected between the power supply node of the driver circuit DRH2 configuring the high side circuit 120 and the power supply node of the driver circuit 140. In other words, an anode of the diode D2 is connected to the power supply node of the driver circuit DRH2, and a cathode thereof is connected to the power supply node of the driver circuit 140. The diode D2 functions as a rectifier circuit for supplying a current from the power supply node of the driver circuit DRH2 toward the power supply node of the driver circuit 140.

Further, the diode D3 is connected between the power supply node of each of the driver circuits DRL1 and DRL2 configuring the low side circuit 130, and the power supply node of the driver circuit 140. In other words, an anode of the diode D3 is connected to the respective power supply nodes of the driver circuits DRL1 and DRL2, and a cathode thereof is connected to the power supply node of the driver circuit 140. The diode D3 functions as a rectifier circuit for supplying a current from the respective power supply nodes of the driver circuits DRL1 and DRL2 toward the power supply node of the driver circuit 140. Here, the diode D3 is configured to secure an initial operating voltage of the driver circuit 140, as will be described later. However, in a case where the initial operating voltage of the driver circuit 140 is secured in advance, the diode D3 may be omitted.

A capacitor CD for retaining the operating voltage of the driver circuit 140 is connected between the power supply node of the driver circuit 140 connected with the respective cathodes of the above-described diodes D1, D2, and D3, and the high voltage node NH connected with the ground node of the driver circuit 140. The capacitor CD is charged by a current or voltage supplied through the diodes D1, D2, and D3, and thereby the operating voltage of the driver circuit 140 is retained by the capacitor CD. Here, as long as the operating voltage of the driver circuit 140 can be retained, the capacitor CD may be substituted by a parasitic capacitance, or the like, and the capacitor CD may be omitted as needed.

In FIG. 1, the capacitor CIN is for smoothing the DC power voltage rectified by the rectifier 110. Inductors LO1 and LO2 are so-called choke coils. A capacitor CO1 functions as a so-called X capacitor, and capacitors CO2 and CO3 function as so-called Y capacitors.

The power supply 150 is a known Rcc (Rising choke converter) power supply that is a flyback power supply. The power supply 150 includes diodes D11, D12, D13, and D14, a capacitor C11, a switching element Q11, a transformer T, diodes D21, D22, and D23, and capacitors C21, C22, and C23. Among these, the diode D11, D12, D13, and D14 configure a rectifier circuit that performs full-wave rectification on the AC power output from the AC power supply GA, and outputs the rectified DC voltage between the cathode of each of the diodes D11 and D12, and the anode of each of the diodes D13 and D14. The capacitor C11 is connected between the cathode of each of the diodes D11 and D12, and the anode of each of the diodes D13 and D14, and smoothes the above-described rectified DC voltage. Here, the AC power to be output from the AC power supply GA can be diverted from, for example, the AC power of one phase of the three-phase AC power generator G. Further, the power supply 150 is not limited to the Rcc power supply, and the power of any type may be used.

A transformer T includes a plurality of primary windings M11 and M12 and a plurality of secondary windings M21, M22, and M23. Among these, one end of the primary winding M11 is connected to the cathodes of the diodes D11 and D12, and the other end of the primary winding M11 is connected to a drain of the switching element Q11. A source of the switching device Q11 is connected to the anodes of the diodes D13 and D14. A gate of the switching element Q11 is connected with one end of the primary winding M12 of the transformer T, and the other end of the primary winding M12 is connected to the source of the switching element Q11 (anodes of the diodes D13 and D14).

One end of the secondary winding M21 of the transformer T is connected with an anode of the diode D21, and a cathode thereof is connected with the positive power supply terminal T1P. The other end of the secondary winding M21 of the transformer T is connected with the negative power terminal T1N. A capacitor C21 is connected between the positive power supply terminal T1P and the negative power supply terminal T1N. Additionally, one end of the secondary winding M22 of the transformer T is connected with an anode of the diode D22, and a cathode thereof is connected with the positive power supply terminal T2P. The other end of the secondary winding M22 of the transformer T is connected with the negative power terminal T2N. A capacitor C22 is connected between the positive power supply terminal T2P and the negative power supply terminal T2N. Further, one end of the secondary winding M22 of the transformer T is connected with an anode of the diode D23, and a cathode thereof is connected with the positive power supply terminal T3P. The other end of the secondary winding M23 of the transformer T is connected with the negative power terminal T3N. A capacitor C23 is connected between the positive power supply terminal T3P and the negative power supply terminal T3N.

In the present embodiment, the positive power supply terminal T1P and the negative power supply terminal T1N are insulated from the ground by the transformer T. For this reason, a power supply voltage VQ1 to be output from power supply 150 to between the positive power supply terminal T1P and the negative power supply terminal T1N is a voltage insulated from the ground voltage. Similarly, the positive power supply terminal T2P and the negative power supply terminal T2N are insulated from the ground. For this reason, a power supply voltage VQ2 to be output from power supply 150 to between the positive power supply terminal T2P and the negative power supply terminal T2N is a voltage insulated from the ground voltage. In contrast, since the negative power supply terminal T3N is grounded, a power supply voltage VQ3 based on the ground voltage is output to the positive power supply terminal T3P.

Here, in the present embodiment, "the positive power supply terminal" and "the negative supply terminal" represent not only a case where polarities of the respective terminals are positive and negative, but also a case where "the positive power supply terminal" is relatively higher in potential than "the negative power supply terminal." However, it may also represent a case where "the positive power supply terminal" is relatively lower in potential than "the negative power supply terminal."

Additionally, although the power supply 150 is a constituent element of the inverter device 100 in the present embodiment, the power supply 150 may be an external power source separated from the inverter device 100. In this case, for example, part of the configuration of the constituent element of the power supply 150, for example, a configuration that causes any one of the power supply voltages VQ1, VQ2, and VQ3, or any combination of those power supply voltages may be provided as a constituent element of the inverter device 100.

(Description of Operation)

Next, operation of the inverter device 100 according to the present embodiment will be described.

In an initial state, the three-phase AC power generator G is not rotated, and the three-phase AC power generator G is not generating a power. In this initial state, the voltage at the high voltage node NH forming the high side arm is close to the ground voltage. In this initial state, the power supply 150 operates based on the AC output of the AC power source GA, generates the power supply voltage VQ1 between the positive power supply terminal T1P and the negative power supply terminal T1N, generates the power supply voltage VQ2 between the positive power supply terminal T2P and the negative power supply terminal T2N, and generates the power supply voltage VQ3 between the positive power supply terminal T3P and the negative power supply terminal T3N. In the present embodiment, the respective voltage values of the power supply voltages VQ1, VQ2, and VQ3 are assumed to be substantially equal. The power supply voltage VQ1 is supplied to the driver circuit DRH1 of the high side circuit 120 through the positive power supply terminal T1P and the negative power supply terminal T1N. Thus, the power supply voltage VQ1 is applied between the ground node and the power supply node of the driver circuit DRH1, and thus the driver circuit DRH1 becomes operable.

Additionally, the power supply voltage VQ2 is supplied to the driver circuit DRH2 of the high side circuit 120 through the positive power supply terminal T2P and the negative power supply terminal T2N. Thus, the power supply voltage VQ2 is applied between the ground node and the power supply node of the driver circuit DRH2, and thus the driver circuit DRH2 becomes operable. Further, the power supply voltage VQ3 is supplied to the driver circuit DRL1 of the low side circuit 130 through the positive power supply terminal T3P and the negative power supply terminal T3N. Thus, the power supply voltage VQ3 is applied between the ground node and the power supply node of the driver circuit DRL1, and thus the driver circuit DRL1 becomes operable. Moreover, the power supply voltage VQ3 is supplied to the driver circuit DRL2 of the low side circuit 130 through the positive power supply terminal T3P and the negative power supply terminal T3N. Thus, the power supply voltage VQ3 is applied between the ground node and the power supply node of the driver circuit DRL2, and thus the driver circuit DRL2 becomes operable.

In the example of FIG. 1, the respective ground nodes of the driver circuits DRL1 and DRL2 of the low side circuit 130 are connected to the low voltage node NL forming the low side arm, and the low voltage node NL is grounded. For this reason, the power supply nodes of the driver circuits DRL1 and DRL2 of the low side circuit 130 are applied with the power supply voltage VQ3 based on the ground voltage. In contrast, the positive power supply terminal T1P and the negative power supply terminal T1N connected respectively to the power supply node and the ground node of the driver circuit DRH1 of the high side circuit 120 are both electrically insulated from the ground. For this reason, the power supply voltage VQ1, while being insulated from the ground potential, is applied between the power supply node and the ground node of the driver circuit DRH1. However, the ground node of the driver circuit DRH1 is connected to the output node NO1 connected with the source of the switching element Q1. For this reason, the power supply node of the driver circuit DRH1 is applied with the power supply voltage VQ1 based on the voltage at the output node NO1. This enables the driver circuit DRH1 to, regardless of the state of the voltage at the output node NO1, generate a gate voltage based on the source voltage of the switching element Q1, thus controlling the conduction of the switching element Q1.

Similarly, the positive power supply terminal T2P and the negative power supply terminal T2N connected respectively to the power supply node and the ground node of the driver circuit DRH2 of the high side circuit 120 are both electrically insulated from the ground. For this reason, the power supply voltage VQ2, while being insulated from the ground is applied between the power supply node and the ground node of the driver circuit DRH2. However, the ground node of the driver circuit DRH2 is connected to the output node NO2 connected with the source of the switching element Q2. For this reason, the power supply node of the driver circuit DRH2 is applied with the power supply voltage VQ2 based on the voltage at the output node NO2. This enables the driver circuit DRH2 to, regardless of the state of the voltage at the output node NO2, generate a gate voltage based on the source voltage of the switching element Q2, thus controlling the conduction of the switching elements Q2.

As described above, the operating voltages of the driver circuits DRH1 and DRH2 configuring the high side circuit 120, and the operating voltages of the driver circuits DRL1 and DRL2 configuring the low side circuit 130, are secured, and thus these driver circuits become operable.

Next, the operation voltage of the driver circuit 140 will be described.

In the initial state in which the power supply 150 is not generating the power supply voltages VQ1, VQ2, and VQ3, the driver circuits DRH1 and DRH2 of the high side circuit 120, the driver circuits DRL1 and DRL2 of the low side circuit 130, and the driver circuit 140 of the rectifier 110, are not operating. For this reason, the respective voltages at the low voltage node NL forming the low side arm and the high voltage node NH forming the high side arm are substantially 0V. Additionally, the respective voltages at the output nodes NO1 and NO2 are also substantially 0V. From this state, when the power supply 150 generates the power supply voltage VQ1 between the positive power supply terminal T1P and the negative power supply terminal T1N, the power supply voltage VQ1 is applied between the power supply node and the ground node of the driver circuit DRH1 of the high side circuit 120, and thus the voltage at the power supply node of the driver circuit DRH1 increases. For this reason, a current flows from the power supply node of the driver circuit DRH1 through the diode D1 toward the power supply node of the driver circuit 140. This current charges the capacitor CD.

Additionally, when the power supply 150 generates the power supply voltage VQ2 between the positive power supply terminal T2P and the negative power supply terminal T2N, the power supply voltage VQ2 is applied between the power supply node and the ground node of the driver circuit DRH2 of the high side circuit 120, and thus the potential at the power supply node of the driver circuit DRH2 increases. For this reason, a current flows from the power supply node of the driver circuit DRH2 through the diode D2 toward the power supply node of the driver circuit 140. This current charges the capacitor CD. Further, when the power supply 150 generates the power supply voltage VQ3 between the positive power supply terminal T3P and the negative power supply terminal T3N, the power supply voltage VQ3 is applied between the power supply node and the ground node of each of the driver circuits DRL1 and DRL2 of the low side circuit 130, and thus the potentials at the power supply nodes of the driver circuits DRH1 and DRH2 increase. For this reason, a current flows from the power supply nodes of the driver circuits DRL1 and DRL2 through the diode D3 toward the power supply node of the driver circuit 140. This current charges the capacitor CD.

As described above, the currents flow from the respective power supply nodes of the driver circuits DRH1, DRH2, DRL1, and DRL2 through the diodes D1, D2, and D3 to the power supply node of the driver circuit 140, thus charging the capacitor CD. Consequently, the voltage at the power supply node of the driver circuit 140 increases up to substantially the same level as the power supply voltages VQ1, VQ2, and VQ3, based on the voltage at the high voltage node NH connected with the ground node of the driver circuit 140. Thus, the operating voltage of the driver circuit 140 based on the voltage at the high voltage node NH forming the high side arm is retained by the capacitor CD, and thus the driver circuit 140 becomes operable.

Thereafter, the lower driver circuit 140 controls the conduction of the thyristors SCR1, SCR2, and SCR3 of the rectifier 110 under the control of an unillustrated control circuit. Thereby, the rectifier 110 converts the AC power output from the three-phase AC power generator G into the predetermined DC power, thus generating the DC voltage between the high voltage node NH forming the high side arm and the low voltage node NL forming the low side arm. Thus, in the state of the DC voltage being generated between the high voltage node NH and the low voltage node NL, the high side circuit 120 and low side circuit 130 perform the switching operation.

Figure 2:
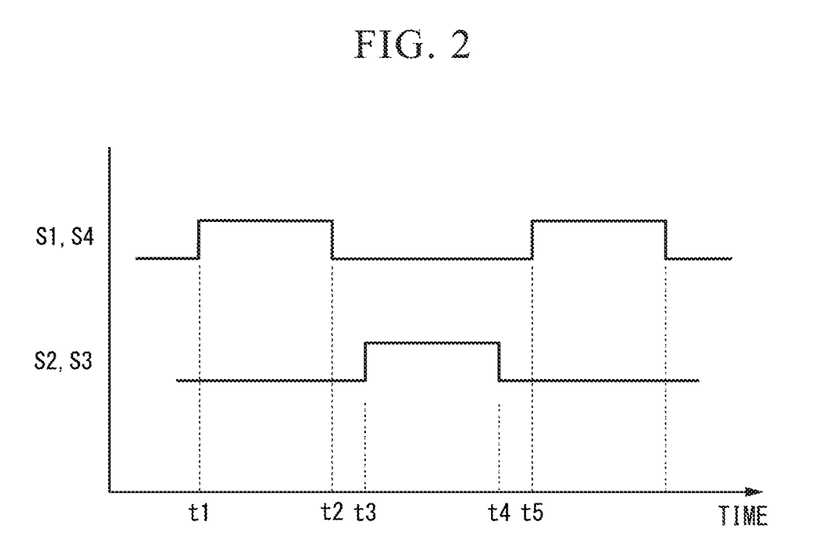
FIG. 2 is a diagram showing an example of a waveform illustrating switching operation of the inverter device according to the first embodiment of the present invention.

FIG. 2 shows an example of waveforms illustrating the switching operation of the inverter device 100 according to the first embodiment of the present invention. Signals S1 and S2 shown in the figure are drive signals respectively output from the driver circuits DRH1 and DRH2 of the above-described high side circuit 120. Signals S3 and S4 are drive signals respectively output from the driver circuits DRL1 and DRL2 of the low side circuit 130. Here, the waveforms of the respective signals shown in the example of FIG. 2 are intended to show a phase relationship, and the respective signal levels will vary depending on the potentials of the ground nodes of the respective driver circuits. The driver circuits DRH1 and DRH2 and the driver circuits DRL1 and DRL2 generate and output the drive signals S1, S2, S3, and S4, under the control of an unillustrated control circuit.

In the present embodiment, as shown in FIG. 2, a phase of the drive signal S1 output from the driver circuit DRH1 configuring the high side circuit 120, and a phase of the drive signal S4 output from the driver circuit DRL2 of the low side circuit 130, are set to be equal. Thus, the switching element Q1 of the high side circuit 120 and the switching element Q4 of the low side circuit 130 perform the switching operation at substantially the same timing. On the other hand, a phase of the drive signal S2 output from the driver circuit DRH2 configuring the high side circuit 120 and a phase of the drive signal S3 output from the driver circuit DRL1 of the low side circuit 130 are set to be equal. Thus, the switching element Q1 of the high side circuit 120 and the switching element Q4 of low side circuit 130 perform the switching operation at substantially the same timing. Additionally, a 180°-phase difference is provided between the drive signals S1 and S4, and between the drive signals S2 and S3. As a result, a pair of switching elements Q1 and Q4, and a pair of switching elements Q2 and Q3, alternately performs the switching operation. This switching operation generates a desired AC power between the output node NO1 and the output node NO2. Then, this AC power is output from the inverter device 100 through the output terminals TO1 and TO2.

Additionally, in the present embodiment, a so-called dead time period is set between each phase of the drive signals S1, S2, S3, and S4, so that all the switching elements are turned off for a fixed period, in the process of switching the switching elements Q1, Q2, Q3, and Q4. In the example of FIG. 2, for example, a time period between time t2 at which the drive signals S1 and S4 transition from the high level to the low level, and thus the switching elements Q1 and Q4 are turned off, and time t3 at which the drive signals S2 and S3 transition from the low level to the high level, and thus the switching elements Q2 and Q3 are turned on, becomes a dead time period. In this dead time period, all the switching elements Q1, Q2, Q3, and Q4 are turned off. Additionally, in the example in FIG. 2, a time period between time t4 at which the drive signals S2 and S3 transition from the high level to the low level, and thus the switching elements Q2 and Q3 are turned off, and time t5 at which the drive signals S1 and S4 transition from the low level to the high level, and thus the switching elements Q1 and Q4 are turned on, also becomes a dead time period. Also in this dead time period, all the switching elements Q1, Q2, Q3, and Q4 are turned off. By providing such a dead time period, it prevents a through current from flowing from the high voltage node NH toward the low voltage node NL when the switching elements Q1, Q2, Q3, and Q4 perform the switching operation.

In the course of the above-described switching operation, the voltage at the output node NO1 varies depending on on/off of the switching elements Q1 and Q3. For example, when the switching element Q1 is turned on, and the switching element Q3 is turned off, the voltage at the output node NO1 increases. On the contrary, when the switching element Q1 is turned off, and the switching element Q3 is turned on, the voltage at the output node NO1 decreases. For this reason, the voltage at the ground node of the driver circuit DRH1 connected to the output node NO1 also varies in accordance with the voltage at the output node NO1. However, the power supply voltage VQ1 is applied between the power supply node and the ground node of the driver circuit DRH1, from the power supply 150 through the positive power supply terminal T1P and the negative power supply terminal T1N. For this reason, even if the voltage at the output node NO1 varies, the driver circuit DRH1 can drive the gate of the switching element Q1 based on the source voltage of the switching element Q1. Therefore, the driver circuit DRH1 can drive the switching element S1, regardless of the variation in voltage at the output node NO1. The same description is applicable to the driver circuit DRH2 of the high side circuit 120.

Here, as described above, when the AC power of the three-phase AC power generator G is rectified by the rectifier circuit 110, and the predetermined DC voltage is generated between the high voltage node NH forming the high side arm and the low voltage node NL forming the low side arm, the voltage between the high voltage node NH and the low voltage node NL becomes higher than the power supply voltages VQ1, VQ2, and VQ3. Thus, the voltage at the ground node of the driver circuit 140 connected to the high voltage node NH becomes higher than the power supply voltages VQ1, VQ2, and VQ3. For the driver circuit 140 to be operable in such a state, it is necessary to supply to the power supply node of the driver circuit 140, a high voltage based on the voltage at the high voltage node NH. In the present embodiment, when the voltage at the high voltage node NH increases as described above, the voltages at the respective power supply nodes of the driver circuits DRH1 and DRH2 of the high side circuit 120 are supplied to the power supply node of the driver circuit 140 through the diodes D1 and D2, as will be described next.

When the switching element Q1 is turned on, and the switching element Q3 is turned off in the course of the above-described switching operation, the voltage at the output node NO1 connected with the source of the switching element Q1 increases close to the voltage at the high voltage node NH connected with the drain of the switching element Q1. Thereby, the voltage at the power supply node of the driver circuit DRH1 whose ground node is connected to the output node NO1 increases close to a voltage obtained by adding the power supply voltage VQ1 to the voltage at the high voltage node NH. Consequently, a current flows from the power supply node of the driver circuit DRH1 through the diode D1 toward the power supply node of the driver circuit 140. Thus, the voltage at the power supply node of the driver circuit 140 increases up to a voltage that is higher substantially by the power supply voltage VQ1 than the voltage at the high voltage node NH. In other words, a voltage substantially equal to the power supply voltage VQ1 is generated between the power supply node and the ground node of the driver circuit 140, and is retained by the capacitor CD, as the operating voltage of the driver circuit 140.

Similarly, when the switching element Q2 is turned on, and the switching element Q4 is turned off in the course of the above-described switching operation, the voltage at the output node NO2 connected with the source of the switching element Q2 increases close to the voltage at the high voltage node NH connected with the drain of the switching element Q2. Thereby, the voltage at the power supply node of the driver circuit DRH2 whose ground node is connected to the output node NO2 increases close to a voltage obtained by adding the power supply voltage VQ2 to the voltage at the high voltage node NH. Consequently, a current flows from the power supply node of the driver circuit DRH2 through the diode D2 toward the power supply node of the driver circuit 140. Thus, the voltage at the power supply node of the driver circuit 140 increases up to a voltage that is higher substantially by the power supply voltage VQ2 than the voltage at the high voltage node NH. In other words, a voltage substantially equal to the power supply voltage VQ2 is generated between the power supply node and the ground node of the driver circuit 140, and is retained by the capacitor CD. Thus, the current flows from the respective power supply nodes of the driver circuits DRH1 and DRH2 through the diodes D1 and D2 into the power supply node of the driver circuit 140, thus charging the capacitor CD connected to the power supply node of the driver circuit 140, so that the operating voltage of the driver circuit 140 is retained by the capacitor CD.

In the present embodiment, the voltage values of the power supply voltage VQ1 and the power supply voltage VQ2 are set equal. For this reason, the voltage at the power supply node of the driver circuit 140 is maintained at a constant voltage that is substantially equal to the respective voltage values of the power supply voltages VQ1 and VQ2, based on the voltage at the high voltage node NH connected with the ground node of the driver circuit 140. Thus, the operating voltage of the driver circuit 140 based on the voltage at the high voltage node NH forming the high side arm is secured. For this reason, even after the voltage at the high voltage node NH increases by the rectification operation of the rectifier 110, the driver circuit 140 can secure the operating voltage from the respective power supply nodes of the driver circuits DRH1 and DRH2 configuring the high side circuit 120, and thus continuously control the conduction of the thyristors SCR1, SCR2, and SCR3 of the rectifier 110.

Figure 3A:
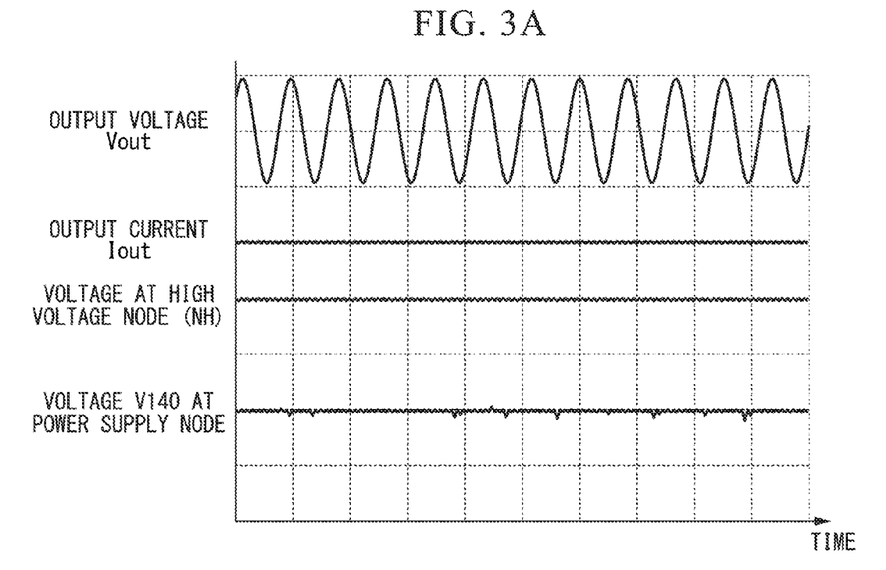
FIG. 3A is a diagram showing an example of a measurement result of electrical characteristics, in an unloaded state, of the inverter device according to the first embodiment of the present invention.
Figure 3B:
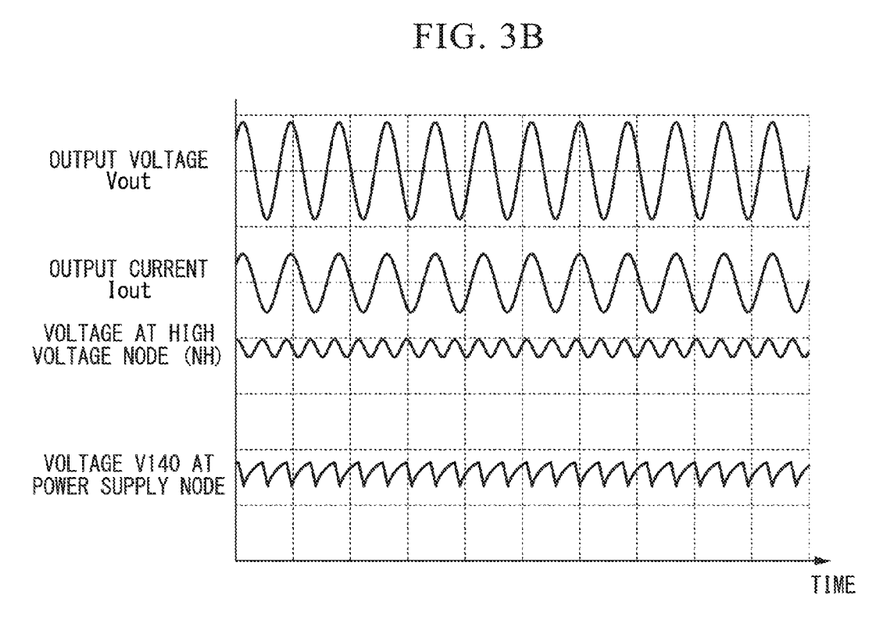
FIG. 3B is a diagram showing an example of a measurement result of electrical characteristics, in a loaded state, of the inverter device according to the first embodiment of the present invention.

FIG. 3A shows an example of a measurement result of the electrical characteristics of the inverter device 100 according to the first embodiment of the present invention, which is an example of the measurement result in an unloaded state (state in which no output load is present). Additionally, FIG. 3B shows an example of a measurement result of the electrical characteristics of the inverter device 100 according to the first embodiment of the present invention, which is an example of the measurement result in a state where an unillustrated output load is present. Each of FIGS. 3A and 3B shows, sequentially in order from the top towards the bottom, a waveform of an output voltage Vout generated between the output terminal TO1 and the output terminal TO2, a waveform of an output current Iout flowing through the unillustrated output load between the output terminal TO1 and the output terminal TO2, a waveform of the DC voltage output from the rectifier 110 to the high voltage node NH, and a waveform of the voltage V140 at the power supply node of the driver circuit 140. Compared with the respective waveforms of FIG. 3A in the unloaded state, ripples are generated in the respective waveforms shown in FIG. 3B where the load is present. However, the ripples are within the allowable range, and can be improved. Although the ripples are generated in the waveforms in the case where the output load is present, the basic operation of the driver circuit 140 was confirmed experimentally by the present inventors.

According to the above-described first embodiment of the present invention, the operating voltage of the driver circuit 140 that drives the thyristors SCR1, SCR2, and SCR3 of the rectifier circuit 110 can be obtained from the power supply nodes of the driver circuits DRH1 and DRH2 configuring the high side circuit 120. Therefore, it becomes unnecessary to provide an isolated power supply that generates the operating voltage of the driver circuit 140 based on the voltage at the high-voltage node NH forming the high side arm. In other words, the operating voltage (operating power) of the driver circuit 140 can be obtained without using an isolated power supply. Thus, according to the first embodiment, it is possible to simplify the configuration of the power supply 150. Specifically, it is possible to reduce the size of an iron core (core) configuring the transformer T of the power supply 150, thus making it possible to reduce the size of the transformer T. Therefore, it is possible to reduce the size and the cost of the inverter device 100.

Second Embodiment

Next, a second embodiment of the present invention will be described with reference to FIG. 4.

Figure 4:
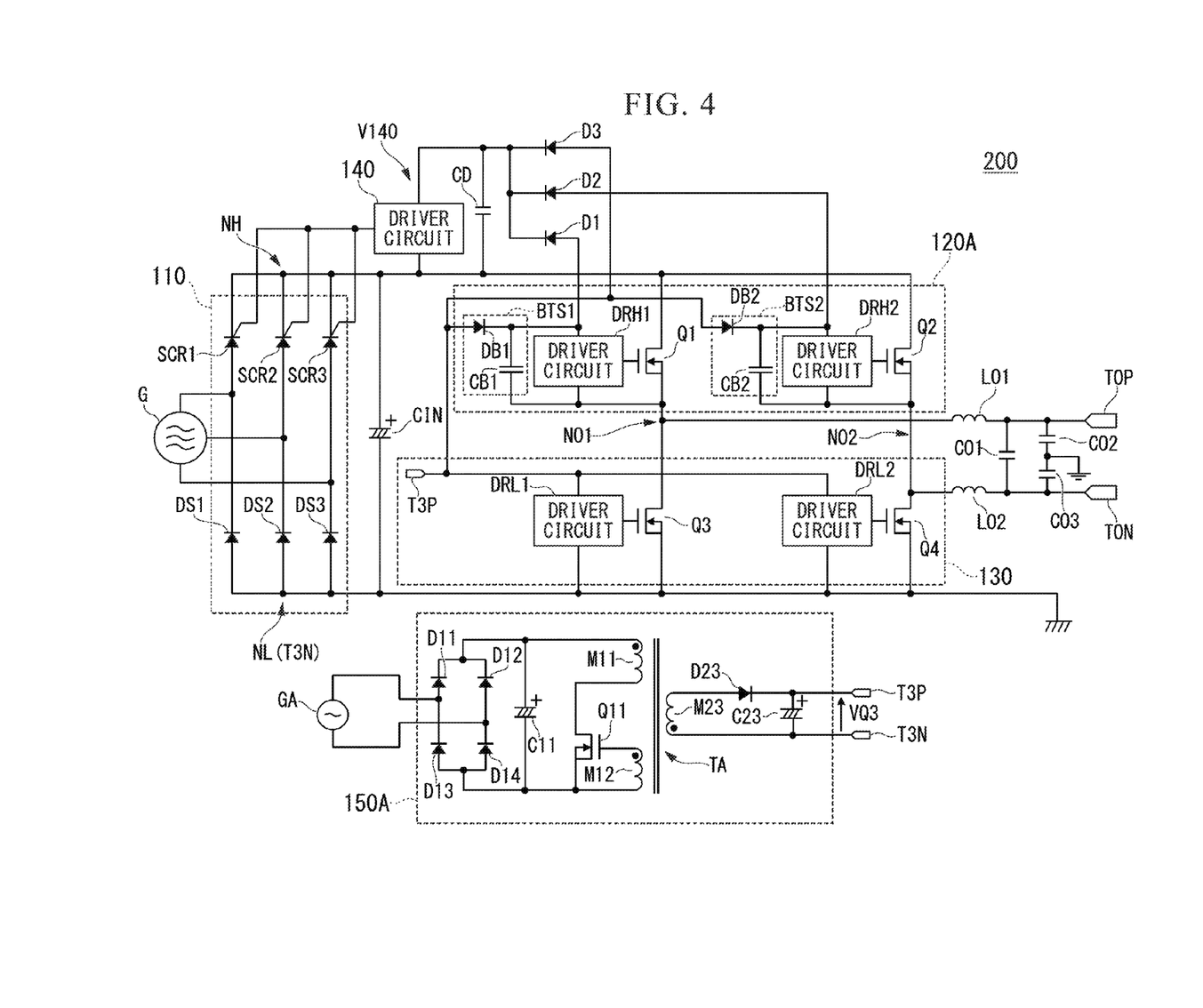
FIG. 4 is a diagram showing an example of a circuit configuration of an inverter device according to a second embodiment of the present invention.

FIG. 4 is a diagram showing an example of a circuit configuration of an inverter device 200 according to the second embodiment of the present invention. The inverter device 200 according to the present embodiment has the configuration of the inverter device 100 shown in FIG. 1 according to the above-described first embodiment, except that a high side circuit 120A and a power supply 150A are provided in place of the high side circuit 120 and the power supply 150. Other configurations are the same as those of the first embodiment.

Here, the high side circuit 120A includes a so-called bootstrap circuit for each of the driver circuits DRH1 and DRH2. In other words, the driver circuit DRH1 is provided with a bootstrap circuit BTS1 including a diode DB1 and a capacitor CB1. Additionally, the driver circuit DRH2 is provided with a bootstrap circuit BTS2 including a diode DB2 and a capacitor CB2. Here, a cathode of the diode DB1 included in the bootstrap circuit BTS1 is connected to the power supply node of the driver circuit DRH1. Additionally, an anode of the diode DB1 is connected to the power supply node of each of the driver circuits DRL1 and DRL2 configuring the low side circuit 130, that is, the positive power supply terminal T3P of the power supply 150A. The capacitor CB1 included in the bootstrap circuit BTS1 is connected between the power supply node and the output node NO1 of the driver circuit DRH1. Further, a cathode of the diode DB2 included in the bootstrap circuit BTS2 is connected to the power supply node of the driver circuit DRH2. Additionally, an anode of the diode DB2 is connected to the power supply node of each of the driver circuits DRL1 and DRL2 configuring the low side circuit 130, that is, the positive power supply terminal T3P of the power supply 150A. The capacitors CB2 included in the bootstrap circuit BTS2 is connected between the power supply node and the output node NO2 of the driver circuit DRH2.

When the voltage at the output node NO1 decreases, the bootstrap circuit BTS1 charges the capacitor CB1 connected to the power supply node of the driver circuit DRH1 by the voltages at the power supply nodes of the driver circuits DRL1 and DRL2 of the low side circuit 130, and boosts the voltage at the power supply node of the driver circuit DRH1 in response to an increase in voltage at the output node NO1. Additionally, when the voltage at the output node NO2 decreases, the bootstrap circuit BTS2 charges the capacitor CB2 connected to the power supply node of the driver circuit DRH2 by the voltages at the power supply nodes of the driver circuits DRL1 and DRL2 of the low side circuit 130, and boosts the voltage at the power supply node of the driver circuit DRH2 in response to an increase in voltage at the output node NO2. Thus, in the second embodiment, the voltages at the respective power supply nodes of the driver circuits DRH1 and DRH2 are boosted using the bootstrap circuits BTS1 and BTS2, thereby generating the voltages corresponding to the power supply voltages VQ1 and VQ2 of the first embodiment.

Next, operation of the inverter device 200 according to the second embodiment will be described.

When the power supply 150A initiates operation from the initial state, the power supply 150A generates the power supply voltage VQ3. The power supply voltage VQ3 is supplied to the driver circuits DRL1 and DRL2 of the low side circuit 130 through the positive power supply terminal T3P and the negative power supply terminal T3N. Thereby, the power supply voltage VQ3 is applied between the power supply node and the ground node of each of the driver circuits DRL1 and DRL2, and thus the driver circuits DRL1 and DRL2 become operable. Additionally, the power supply voltage VQ3 is applied from the power supply 150A through the positive electrode terminal T3P to the anode of the diode D3. For this reason, a current flows to the power supply node of the driver circuit 140 through the diode D3, the capacitor CD is charged, and the voltage at the power supply node of the driver circuit 140 increases close to the power supply voltage VQ3 based on the voltage at the high voltage node NH. Thereby, the initial operating voltage of the driver circuit 140 is secured, and the driver circuit 140 becomes operable.

When the driver circuit 140 becomes operable, the driver circuit 140 controls conduction of the thyristors SCR1, SCR2, and SCR3 of the rectifier 110. Under this control, the rectifier 110 converts the AC power output from the three-phase AC power generator G into a DC power, thus generating a predetermined DC voltage between the high voltage node NH and the low voltage node NL. Consequently, the voltage at the ground node of the driver circuit 140 connected to the high voltage node NH increases to a voltage higher than the power supply voltage VQ3. For the driver circuit 140 to be operable in such a state, it is necessary to supply to the power supply node of the driver circuit 140, a high voltage based on the voltage at the high voltage node NH connected with the ground node of the driver circuit 140. In the state where the voltage at the high voltage node NH is increased, similarly to the first embodiment, the voltages at the respective power supply nodes of the driver circuits DRH1 and DRH2 of the high side circuit 120 are supplied through the diodes D1 and D2 to the power supply node of the driver circuit 140. In the present embodiment, as will be described next, the voltages at the power supply nodes of the driver circuits DRH1 and DRH2 of the high side circuit 120 are boosted using the bootstrap circuits BTS1 and BTS2, instead of using the power supply voltages VQ1 and VQ2, thus obtaining the operating voltages of the driver circuits DRH1 and DRH2 of the high side circuit 120.

Specific description is given here. The power supply voltage VQ3 generated by the power supply 150A is supplied to the respective power supply nodes of the driver circuit DRL1 and DRL2 of the low side circuit 130, based on the voltage (ground voltage) at the negative electrode terminal T3N. Thereby, the driver circuits DRL1 and DRL2 of the low side circuit 130 become operable. Here, for example, when the driver circuit DRL1 drives and turns on the switching element Q3, the voltage at the output node NO1 decreases down to the ground voltage. At this time, the capacitor CB1 connected between the power supply node and the ground node of the driver circuit DRH1 of the high side circuit 120 is charged by the power supply voltage VQ3 supplied from the power supply 150A through the diode DB1. Thus, the operating voltage of the driver circuit DRH1 is secured, and the driver circuit DRH1 becomes operable. Additionally, when the driver circuit DRL2 drives and turns on the switching element Q4, the voltage at the output node NO2 decreases down to the ground voltage. At this time, the capacitor CB2 connected between the power supply node and the ground node of the driver circuit DRH2 of the high side circuit 120 is charged by the power supply voltage VQ3 supplied from the power supply 150A through the diode DB2. Thus, the operating voltage of the driver circuit DRH2 is secured, and the driver circuit DRH2 becomes operable.

When the driver circuits DRH1, DRH2, DRL1, and DRL2 become operable, the driver circuits DRH1 and DRH2, and the driver circuits DRL1 and DRL2, under control of an unillustrated control circuit, alternately drive the switching elements Q1 and Q4, and the switching elements Q2 and Q3, respectively, to perform switching operation, and thus generate an AC voltage between the output node NO1 and the output node NO2. In this switching operation, after the driver circuit DRL1 turns off the switching element Q3, the driver circuit DRH1 turns on the switching element Q1 after the predetermined dead time period. When the switching element Q1 is turned on, the voltage at the output node NO1 increases to become substantially equal to the voltage at the high voltage node NH. When the voltage at the output node NO1 increases, the voltage at the power supply node of the driver circuit DRH1 is boosted by the capacitor CB1 of the bootstrap circuit BTS1. Thus, a current flows from the power supply node of the driver circuit DRH1 through the diode D1 to the power supply node of the driver circuit 140, thus charging the capacitor CD. In this case, the voltage at the power supply node of the driver circuit 140 becomes relatively higher than the voltage at the high voltage node NH forming the high side arm, approximately by the voltage corresponding to the power supply voltage VQ3.

Similarly, in the course of the above-described switching operation, when the switching element Q4 is turned off, and the switching element Q2 is turned on, the voltage at the output node NO2 increases to become substantially equal to the voltage at the high voltage node NH. When the voltage at the output node NO2 increases, the voltage at the power supply node of the driver circuit DRH2 is boosted by the capacitor CB2 of the bootstrap circuit BTS2. Thus, a current flows from the power supply node of the driver circuit DRH2 through the diode D2 to the power supply node of the driver circuit 140, thus charging the capacitor CD. In this case, the voltage at the power supply node of the driver circuit 140 becomes relatively higher than the voltage at the high voltage node NH forming the high side arm, approximately by the voltage corresponding to the power supply voltage VQ3.

Thus, in the second embodiment, the voltages at the power supply nodes of the driver circuits DRH1 and DRH2 of the high side circuit 120 are boosted using the bootstrap circuits BTS1 and BTS2, thus securing the operating voltages required for the driver circuit 140 to drive the thyristors SCR1, SCR2, and SCR3 of the rectifier 110, even after the voltage at the high voltage node NH transitions from the initial state to the increased state.

According to the second embodiment, the bootstrap circuits BTS1 and BTS2 are used, thereby making the power supply voltages VQ1 and VQ2 of the first embodiment unnecessary. For this reason, an isolated power supply becomes no longer required, and thus there is no need to use the Rcc power supply. In other words, it is possible to implement the power supply 150A by a power supply using a non-insulated transformer. Therefore, further simplification of the power supply 150A is enabled, compared with the first embodiment.

Additionally, according to the second embodiment, since an isolated power supply becomes no longer required, it becomes easier to secure a creeping breakdown voltage of a circuit board (not shown) where the power supply nodes of the respective driver circuits of the high side circuit 120 and the low side circuit 130 are formed. Therefore, in a pattern design of the circuit board, it is possible to reduce restrictions on the creeping breakdown voltage, thus making it possible to promote the efficiency of the design work.

Third Embodiment

Next, a third embodiment of the present invention will be described with reference to FIG. 5.

Figure 5:
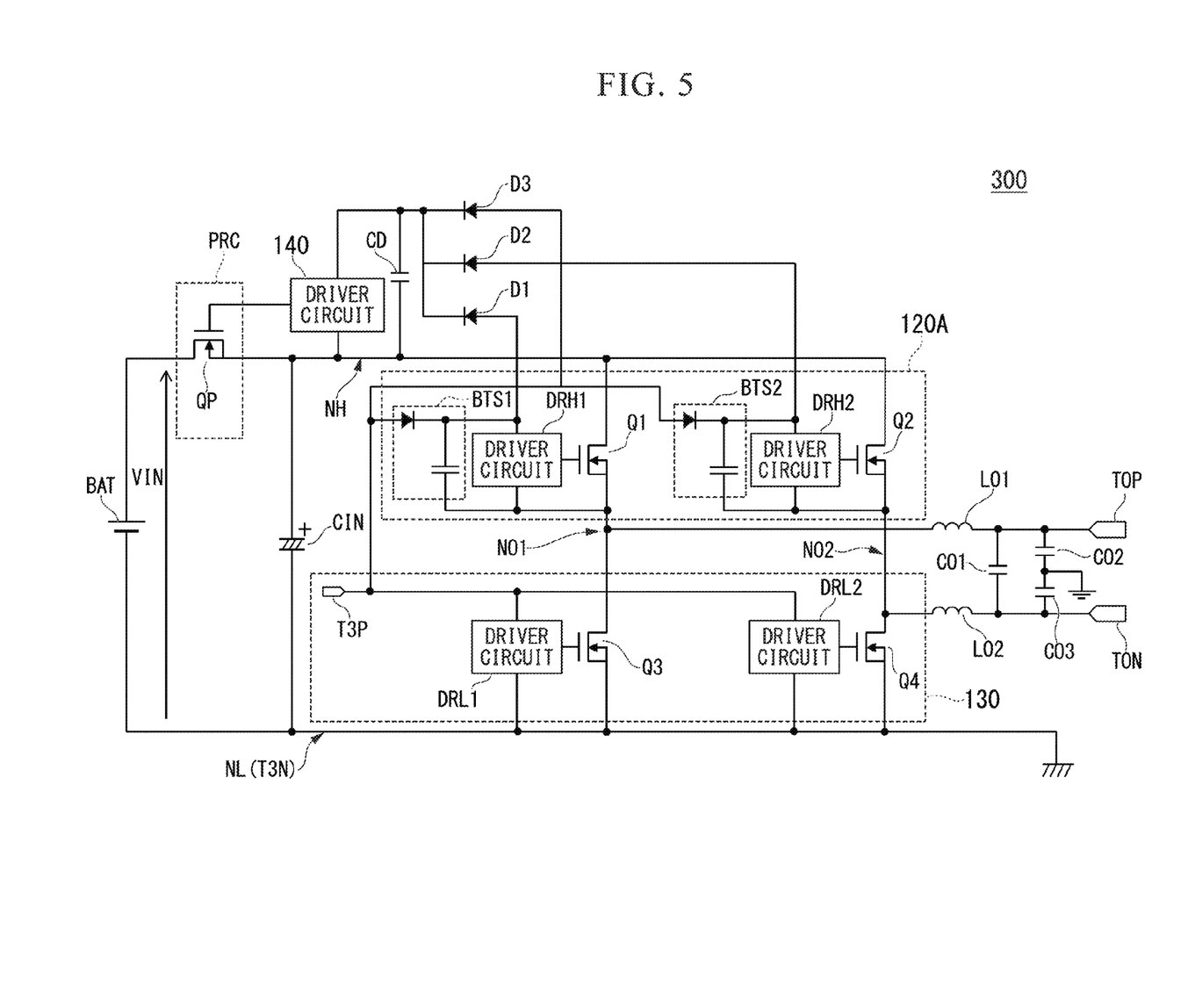
FIG. 5 is a diagram showing an example of a circuit configuration of an inverter device according to a third embodiment of the present invention.

FIG. 5 shows an example of a circuit configuration of an inverter device 300 according to the third embodiment of the present invention.

The inverter device 300 has the configuration of the inverter device 200 shown in FIG. 4 according to the above-described second embodiment, except that a DC power supply BAT (e.g., a battery) is provided in place of the three-phase AC power generator G, and a protection circuit PRC including a switching element QP for protecting the inverter device 300 against overvoltage or the like is provided in place of the rectifier 110. The switching element QP is, for example, an FET (Field Effect Transistor). Other configurations are the same as those of the second embodiment. Here, in FIG. 5, illustration of the power supply 150A and the like shown in FIG. 4 is omitted. Here, in the example of FIG. 5, similarly to the second embodiment, although a case of using the bootstrap circuits BTS1 and BTS2 is taken as an example, a configuration may be such that the power supply 150 is provided similarly to the first embodiment, so that the power supply voltages VQ1 and VQ2 are supplied from the power supply 150 to the driver circuits DRH1 and DRH2.

In the third embodiment, a DC voltage VIN to be generated by the DC power supply BAT is supplied through the switching element Q of the protection circuit PRC to the high voltage node NH forming the high side arm. Here, in order to protect the inverter device 300, when it becomes necessary to block the DC voltage VIN supplied from the DC power supply BAT, the driver circuit 140 turns off the switching element QP of the protection circuit PRC under the control of an unillustrated control circuit. In this case, the voltage based on the voltage at the high voltage node NH is supplied between the power supply node and the ground node of the driver circuit 140, through the diodes D1, D2, and D3, similarly to the second embodiment. For this reason, the driver circuit 140 can generate a gate voltage of the switching element Q based on the source voltage of the switching element QP connected to the high voltage node NH. Therefore, it is possible to control, by the driver circuit 140, the conduction of the switching element Q configuring the protection circuit PRC, thus making it possible to block the DC voltage VIN by the switching element Q. Other operations are the same as those of the second embodiment.

As described above, according to the third embodiment, it is possible to generate the operating voltage of the driver circuit 140 that drives the switching element QP configuring the protection circuit PRC.

Fourth Embodiment

Next, a fourth embodiment of the present invention will be described with reference to FIG. 6.

Figure 6:
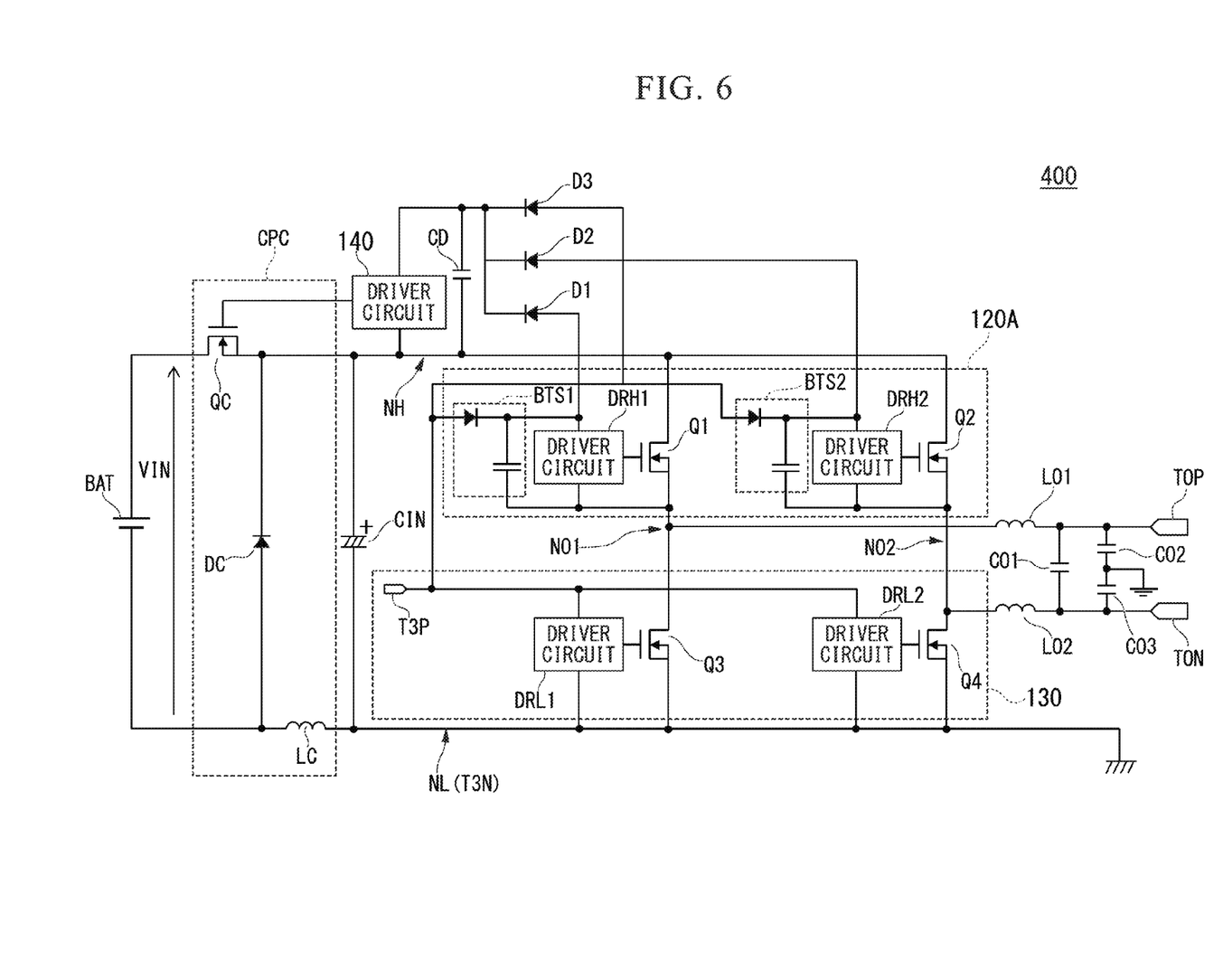
FIG. 6 is a diagram showing an example of a circuit configuration of an inverter device according to a fourth embodiment of the present invention.

FIG. 6 shows an example of a circuit configuration of an inverter unit 400 according to the fourth embodiment of the present invention.

The inverter device 400 has the configuration of the inverter device 200 shown in FIG. 4 according to the above-described second embodiment, except that a DC power supply BAT (e.g., a battery) is provided in place of the three-phase AC power generator G, and a step-down chopper circuit CPC including a switching element QC, a diode DC, and an inductor LC, is provided in place of the rectifier 110. Other configurations are the same as the second embodiment. Other configurations are the same as those of the second embodiment. Here, in FIG. 6, illustration of the power supply 150A and the like shown in FIG. 4 is omitted. Also in the example of FIG. 5, although the bootstrap circuits BTS1 and BTS2 are used similarly to the second embodiment, a configuration may be such that the power supply 150 is provided similarly to the first embodiment, so that the power supply voltages VQ1 and VQ2 are supplied from the power supply 150 to the driver circuits DRH1 and DRH2.

In the fourth embodiment, the DC voltage VIN to be generated by the DC power supply BAT is intermittently supplied to the high voltage node NH forming the high side arm, through the switching element QC configuring the step-down chopper circuit CPC. The capacitor CIN is applied with the voltage stepped down according to the duty of the on/off of the switching element QC. Here, when the switching element QC is turned off, the current retained in the coil LC configuring the step-down chopper circuit CPC is recirculated through the diode DC. Thereby, even in a period in which the switching element QC is turned off, the output current of the inverter unit 400 is secured.

Additionally, the driver circuit 140 drives the switching element QC under control of an unillustrated control circuit. In this case, the voltage based on the voltage at the high voltage node NH is supplied between the power supply node and the ground node of the driver circuit 140, through the diode D1, D2, and D3, similarly to the second embodiment. For this reason, the driver circuit 140 may generate the gate voltage of the switching element QC based on the source voltage of the switching element QC connected to the high voltage node NH. Therefore, it is possible to control, by the driver circuit 140, the conduction of the switching element QC, thus making it possible to intermittently supply, by the switching element Q, the DC voltage VIN to the high voltage node NH. Other operations are the same as those of the second embodiment.

As described above, according to the fourth embodiment, it is possible to generate the operating voltage of the driver circuit 140 that drives the switching element QC configuring the step-down chopper circuit CPC.

Fifth Embodiment

Next, a fifth embodiment of the present invention will be described with reference to FIG. 7.

Figure 7:
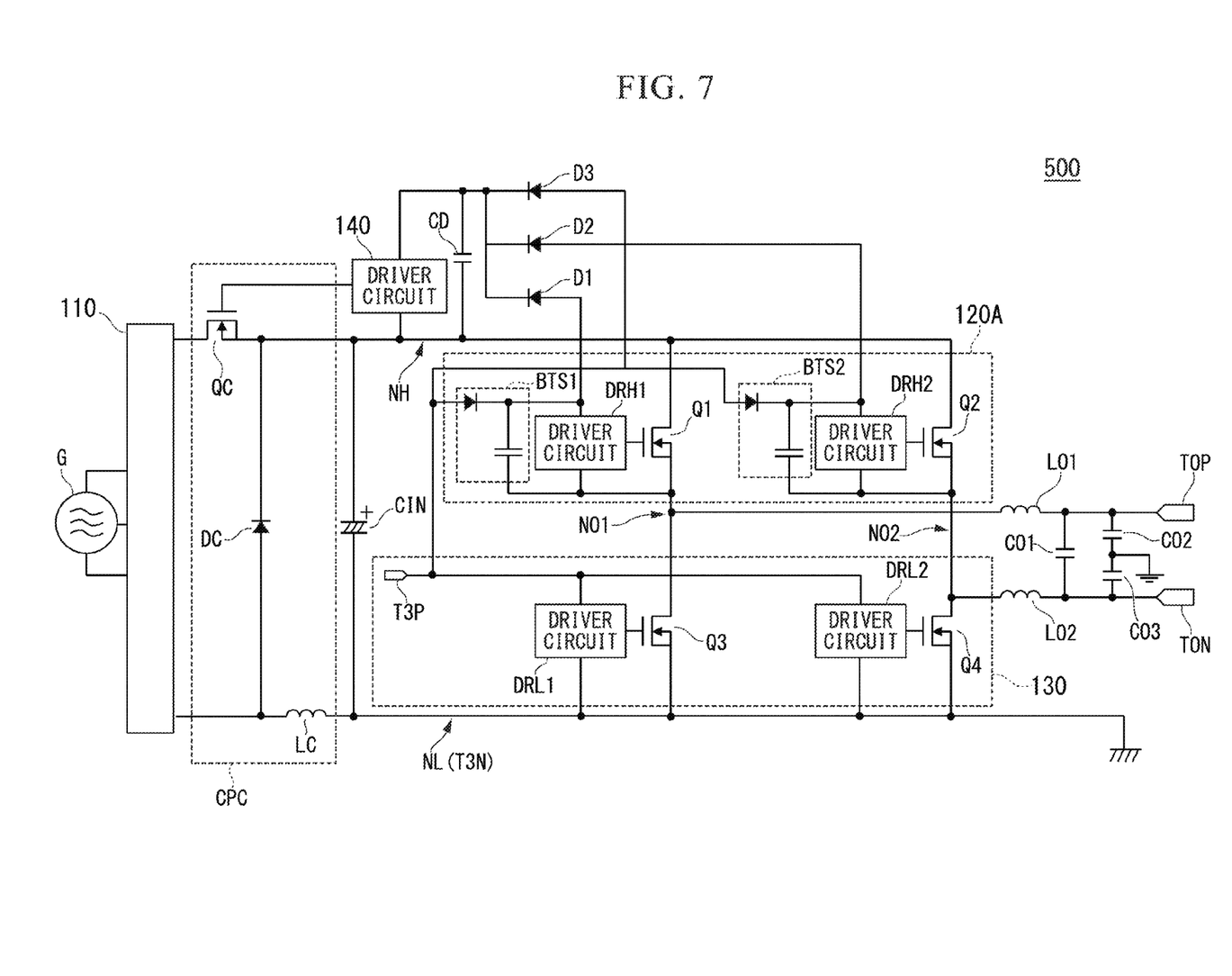
FIG. 7 is a circuit diagram showing an example of a circuit configuration of an inverter device according to a fifth embodiment of the present invention.

FIG. 7 shows an example of a circuit configuration of an inverter device 500 according to the fifth embodiment of the present invention.

The inverter device 500 has the configuration of the inverter device 200 shown in FIG. 4 according to the above-described second embodiment, except that the step-down chopper circuit CPC including the switching element QC, the diode DC, and the inductor LC is provided, similarly to the above-described fourth embodiment. Other configurations are the same as those of the second embodiment. Here, in FIG. 7, illustration of the power supply 150A and the like shown in FIG. 4 is omitted.

Operation of the inverter device 500 according to the fifth embodiment is similar to that of the second embodiment, except the operation regarding the step-down chopper circuit CPC. The operation of the step-down chopper circuit is similar to that of the above-described fourth embodiment.

As described above, according to the fifth embodiment, an isolated power supply becomes no longer required, similarly to the second embodiment. Additionally, similarly to the fourth embodiment, it becomes possible to generate the operating voltage of the driver circuit 140 that drives the switching element QC configuring the step-down chopper circuit CPC.

Although the embodiments of the present invention have been described above, the present invention is not limited to the above-described embodiments, and various modifications and applications may be made without departing from the scope of the present invention.

DESCRIPTION OF REFERENCE NUMERALS

100, 200, 300, 400, 500: inverter device
110: rectifier
120, 120A: high side circuit
130: low side circuit 140: driver circuit
150, 150A: power supply
BAT: DC power supply
BTS1, BTS2: bootstrap circuit
D1, D2, D3: diode (rectifier circuit)
DRH1, DRH2, DRL1, DRL2: driver circuit
G: three-phase AC power generator
GA: AC power supply

The invention claimed is:

1. An inverter device comprising:
a power converter configured to power-convert an input power into a DC power to generate a voltage of the DC power between a high voltage node and a low voltage node;
a first switching element connected between an output node and the high voltage node;
a second switching element connected between the output node and the low voltage node;
a first driver circuit having a power supply node to be supplied with an operating voltage based on a voltage at the output node, and the first driver circuit being configured to drive the first switching element based on the voltage at the output node;
a second driver circuit having a power supply node to be supplied with an operating voltage based on a voltage at the low voltage node, and the second driver circuit being configured to drive the second switching element based on the voltage at the low voltage node;
a third driver circuit having a power supply node to be supplied with an operating voltage based on a voltage at the high voltage node, and the third driver circuit being configured to drive the power converter based on the voltage at the high voltage node;
a first rectifier circuit connected between the power supply node of the first driver circuit and the power supply node of the third driver circuit, and the first rectifier circuit being configured to supply a current from the power supply node of the first driver circuit toward the power supply node of the third driver circuit;
a second rectifier circuit connected between the power supply node of the second driver circuit and the power supply node of the third driver circuit, and the second rectifier circuit being configured to supply a current from the power supply node of the second driver circuit toward the power supply node of the third driver circuit; and
a bootstrap circuit configured to
charge the power supply node of the first driver circuit by a voltage at the power supply node of the second driver circuit when the voltage at the output node decreases, and
boost a voltage at the power supply node of the first driver circuit in response to an increase in the voltage at the output node,
wherein the bootstrap circuit comprises:
a diode having an anode connected to the power supply node of the second driver circuit and a cathode connected to the power supply node of the first driver circuit; and
a capacitor connected between the power supply node and the output node of the second driver circuit.

2. The inverter device according to claim 1, further comprising:
a power supply configured to generate an operating voltage of the second driver circuit, and supply the operating voltage to the power supply node of the second driver circuit.

3. The inverter device according to claim 1, wherein the rectifier circuit is a diode.

4. The inverter device according to claim 1, wherein the power converter comprises any one of:
a rectifier circuit configured to rectify the input power;
a step-down chopper circuit configured to step down a voltage of the input power; and
a protection circuit configured to block the input power.

* * * * *